C. D. DECKER.
Straw-Conveyors for Thrashing-Machines.
No. 141,858. Patented August 19, 1873.
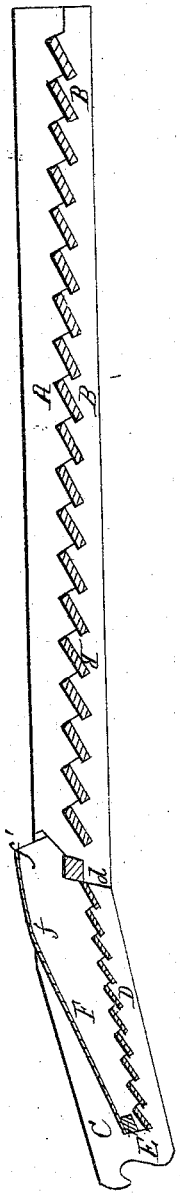

UNITED STATES PATENT OFFICE.

CHARLES D. DECKER, OF BONUS, ILLINOIS.

IMPROVEMENT IN STRAW-CONVEYERS FOR THRASHING-MACHINES.

Specification forming part of Letters Patent No. 141,858, dated August 19, 1873; application filed February 24, 1873.

*To all whom it may concern:*

Be it known that I, CHARLES D. DECKER, of Bonus, in the county of Boone and State of Illinois, have invented a new and useful Improvement in Grain-Thrashing Separators; and I do hereby declare that the following is a full and exact description of the same, reference being had to the accompanying drawings and to the letters of reference marked thereon.

Figure 1 represents a vertical longitudinal section through the straw-carrier and inclined removable extension or so much thereof as is necessary to show my invention.

My invention relates more particularly to that class of straw-carriers or separator-attachments to thrashing-machines in which the floor of the carrier is composed of a series of slats arranged with spaces between them through which the grain escapes to a second section or shaker located below the straw-carrier, and in which the straw-carrier is provided with a series of vibrating or rock shafts, armed with lifting-fingers, which lift and shake up the straw during its passage over the carrier, and assist in effecting the separation of the grain therefrom. In this class of separators it has been usual to attach to the discharge or tail end of the carrier a series of inclined teeth, aranged longitudinally relative to said carrier, over which the straw passes as it is discharged from the carrier, and these, by the increased space between them over that between the slats composing the flooring of the carrier, are intended to effect the separation from the straw of any grain which has failed to escape therefrom during its passage over the slatted floor. In practice I have found that after the straw has passed upon these inclined fingers and escaped from the action of the lifting shaking-fingers, instead of the process of separation being effectively continued, the forward movement of the straw is simply resisted by the inclined teeth, and the straw tends to remain stationary and become compacted thereon until the accumulation of straw behind forces it forward, when it simply slides smoothly forward on the fingers until it drops over the end thereof in a compacted shape, carrying with it much of the grain which the fingers were intended to separate; and this, in connection with the strong blast or current of air passing directly underneath the fingers and in the direction of the movement of the straw, and which carries the grain escaping through the straw directly into the falling straw or straw heap, frequently causes the waste or loss of sufficient grain to have defrayed the whole expense of thrashing.

The object of my invention is to obviate this loss or waste; and to this end my invention consists in the employment, in combination with the shaker or carrier, of an inclined removable slatted extension or tail piece provided with a transversely slatted bottom and a chute or slide arranged underneath the slats to return the grain escaping through the slats, and deliver it out of the way of the falling straw, as hereinafter explained.

In the drawing, A represents the side of the vibrating carrier or shaker, and B the slats composing the bottom of the same. This carrier, as above stated, may be of the usual or any desired construction and provided at suitable points in its length with any desired number of transversely-arranged rock-shafts, with longitudinally-arranged vibrating lifting-fingers, and also, if desired, with the ordinary rotary picker, and it may be combined with the thrasher for receiving the straw therefrom and connected with a lower perforated or close-floored bottom, and with the crank-shafts for operating the same, and the lifting-fingers, in any usual or approved way. To the outer or tail end of this shaker, instead of the usual carrying-fingers, I attach a removable inclined tail-piece or extension, C, composed of vertical longitudinal sides connected by a series of transverse slats, D, arranged in a plane inclining upward from the receiving end *d* to the delivery end, but each with its rear edge overlapping or arranged in a plane above the forward edge of the succeeding slat, as shown in the drawing. The arrangement of these slats in the extension may be similar to that of slats B of the shaker, except that they are in a plane inclining upward from the plane of shaker A from the point of connection therewith to the delivery end, as shown, but by preference they are made narrower and placed somewhat nearer together, but sufficiently far apart to permit the grain to escape readily between them. The connection of this extension or tail-piece with the end of the carrier may be made by hooks or slotted straps and secured by bolts or set-screws, which, if desired, may be arranged to permit the adjustment of the angle of the tail-piece, as desired, or as the character or condition of the grain operated upon may require. At the outer or delivery end of the tail-piece C is placed a transverse bar, E, which forms the support for the rear upper end of an inclined close bottom or chute, F, which inclines downward and forward from said bar E to a point, $f$, at or near its forward or delivery end where the angle of inclination is changed, and the bottom approaches more nearly a horizontal plane thence to the delivery end $f'$. By this arrangement the grain which passes through between the slats D is returned backward away from the falling straw, and by means of the angle $f$ and the more nearly horizontal portion the backward movement of the grain is slightly retarded, giving opportunity for the blast or current of air referred to to cleanse it of the chaff and other refuse matter. By the construction of the slatted floor of the extension or tail-piece the straw is made to pass over a series of inclined steps, which, in connection with the inclined position of the tail-piece, while they serve to sufficiently retard the discharge of the straw, at the same time keep up the agitation thereof requisite for effecting the separation of the grain therefrom.

Having thus described my invention, what I claim as new, and desire to secure by Letters Patent, is—

1. The inclined extension or tail-piece C, provided with the slatted bottom, in combination with the vibrating shaker or straw-carrier, substantially as and for the purpose described.

2. The removable inclined slatted extension or tail-piece C, provided with the inclined-bottom or chute-board F, constructed and operating substantially as described.

This specification signed and witnessed this 17th day of February, 1873.

CHARLES D. DECKER.

Witnesses:
   G. W. FORD,
   A. E. BABCOCK.